United States Patent
Ono et al.

(10) Patent No.: US 6,589,597 B1
(45) Date of Patent: Jul. 8, 2003

(54) ETHYLENE/TETRAFLUOROETHYLENE/FLUORINATED VINYL MONOMER COPOLYMER POWDER AND MOLDING METHOD THEREFOR

(75) Inventors: Mitsufumi Ono, Kanagawa (JP); Teruo Takakura, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/646,100

(22) PCT Filed: Mar. 17, 1999

(86) PCT No.: PCT/JP99/01324

§ 371 (c)(1),
(2), (4) Date: Sep. 20, 2000

(87) PCT Pub. No.: WO99/48952

PCT Pub. Date: Sep. 30, 1999

(30) Foreign Application Priority Data

Mar. 20, 1998 (JP) ............................................. 10-072670

(51) Int. Cl.[7] .................................. B05D 3/02; B05D 1/12
(52) U.S. Cl. .................... 427/195; 427/202; 427/374.4; 427/385.5; 264/460; 526/242
(58) Field of Search ................. 427/195, 203, 427/372.2, 374.4, 375, 385.5, 407.1; 264/109; 106/38.2; 526/250, 253, 254, 255, 243, 245, 247, 249

(56) References Cited

U.S. PATENT DOCUMENTS

| | | | |
|---|---|---|---|
| 3,624,250 A | * 11/1971 | Carlson | .................... 260/80.75 |
| 3,960,825 A | * 6/1976 | Robinson et al. | ........... 526/206 |
| 4,001,360 A | * 1/1977 | Davis et al. | .................. 264/49 |
| 4,033,939 A | * 7/1977 | Schulze | .................. 260/878 R |
| 4,123,602 A | * 10/1978 | Ukihashi et al. | ............. 526/206 |
| 4,166,165 A | * 8/1979 | Hisasue et al. | ................ 526/87 |
| 4,338,237 A | * 7/1982 | Sulzbach et al. | ........... 524/777 |

FOREIGN PATENT DOCUMENTS

| | | | |
|---|---|---|---|
| EP | 0 121 073 | 10/1984 | |
| EP | 0 185 241 | 6/1986 | |
| EP | 0 318 027 | 5/1989 | |
| EP | 0 318 027 A1 * | 5/1989 | ............ C09D/3/78 |
| EP | 0 411 214 | 2/1991 | |
| EP | 0 638 596 | 2/1995 | |
| EP | 0 638 596 A1 * | 2/1995 | ........... C08F/14/18 |
| EP | 0 939 088 | 9/1999 | |
| JP | 49-112977 | 10/1974 | |
| JP | 50-156542 | 12/1975 | |
| JP | 51-116849 | 10/1976 | |
| JP | 51-127137 | 11/1976 | |
| JP | 1-139657 | 6/1989 | |
| WO | WO 01/19880 | 3/2001 | |

* cited by examiner

*Primary Examiner*—Shrive P. Beck
*Assistant Examiner*—William Phillip Fletcher, III
(74) *Attorney, Agent, or Firm*—Oblon, Spivak, McClelland, Maier & Neustadt, P.C.

(57) ABSTRACT

An ETFE powder having a viscosity factor $\phi$ of at most $1\times10^4$ Pa·sec, an anelasticity factor $\epsilon$ of at most $5\times10^{-4}$ Pa$^{-1}$, an average particle diameter of from 5 to 1,000 μm and an apparent density of at least 0.5 g/cc, is deposited on a substrate surface, followed by heat melting and cooling for solidification to form a film.

14 Claims, No Drawings

ETHYLENE/TETRAFLUOROETHYLENE/ FLUORINATED VINYL MONOMER COPOLYMER POWDER AND MOLDING METHOD THEREFOR

TECHNICAL FIELD

The present invention relates to a molding method or an ethylene/tetrafluoroethylene type copolymer (hereinafter referred to also as ETFE) powder. Particularly, it relates to a molding method for an ETFE powder whereby a coating film excellent in the surface smoothness can be obtained, and an ETFE powder therefor.

BACKGROUND ART

ETFE is excellent in heat resistance and chemical resistance and is therefore widely used as a material suitable for corrosion resistant lining or corrosion resistant containers, etc. As a processing method for corrosion resistant lining, there is a method wherein ETFE is powdered and subjected to a known method such as electrostatic powder coating, fluid bed coating or rotational molding to form coating films on various substrates. Further, as a processing method for corrosion resistant containers, there is a method wherein: ETFE is powdered and subjected to a mold, whereby a bottle molded product having any shape is obtained by a molding method such as rotational molding.

However, in a molding method for a powder, it sometimes tends to be difficult to increase the smoothness of the surface of the coating film, since no external shearing stress is exerted during the melting and solidification of a resin.

DISCLOSURE OF THE INVENTION

The present invention has an object to provide a molding method for a novel ETFE powder, whereby the surface smoothness of the coating film thereby obtained, can be remarkably improved. The present invention provides an ETFE powder which is made of ETFE of ethylene, tetrafluoroethylene and a fluorine-containing vinyl monomer copolymerizable therewith, said copolymer having a viscoelastic property represented by the formula (1) wherein the viscosity factor $\phi$ in the formula (1) is at most $1\times10^4$ Pa·sec, and the anelasticity factor $\epsilon$ represented by the formula (2) as the sum of $\epsilon_i$ in the formula (1) is at most $5\times10^{-4}$ Pa$^{-1}$, and which has an average particle diameter of from 5 to 1,000 μm and an apparent density of at least 0.5 g/cc:

$$J(t) = t/\phi + \sum_{i=1}^{6} [\epsilon_i(1 - \exp(-t/\tau_i))] \quad (1)$$

$$\varepsilon = \sum_{i=1}^{6} \varepsilon_i \quad (2)$$

provided that in the formulae (1) and (2), J(t) is the amount of strain per unit stress under a predetermined stress, $\phi$ is a viscosity factor, t is time, $\epsilon$ is an anelasticity factor, i is an integer of from 1 to 6, and $\tau_i$ is a constant ($\tau_1$=0.135 sec, $\tau_2$=0.368 sec, $\tau_3$=1.000 sec, $\tau_4$=2,718 sec, $\tau_5$=7.389 sec, $\tau_6$=20.086 sec)

Further, it provides a molding method for an ETFE powder characterized by depositing the above ETFE powder on a substrate surface, followed by heat melting and cooling for solidification to form a coating film.

BEST MODE FOR CARRYING OUT THE INVENTION

ETFE to be used in the present invention is one obtained by copolymerizing tetrafluoroethylene (hereinafter referred to as TFE), ethylene and a fluorine-containing vinyl monomer copolymerizable therewith, wherein the molar ratio of polymer units based on TFE/polymer units based on ethylene is preferably 90 to 50/10 to 50. If the molar ratio of polymer units based on TFE/polymer units based on ethylene is lower than 50/50, the decomposition temperature tends to be low, whereby the moldability tends to be impaired. On the other hand, if this molar ratio exceeds 90/10, by-product polytetrafluoroethylene is likely to be present in ETFE, and the formed coating film is likely to form gels, or the high surface smoothness intended by the present invention, tends to be impaired.

The fluorine-containing vinyl monomer to be used in the present invention is a fluorine-containing vinyl monomer copolymerizable with TFE and ethylene, and the following ones may, for example, be mentioned. The fluorine-containing vinyl monomers may be used alone or in combination as a mixture of two or more of them.

Poly (or mono) fluoroethylenes such as $CF_2$=CFCl, and $CF_2$=$CH_2$.

Poly (or mono) fluoropropylenes such as $CF_2$=$CFCF_3$, and $CF_2$=$CHCF_3$.

(Poly (or mono) fluoroalkyl) ethylenes such as $CH_2$=CH$(CF_2)_2$F, and $CH_2$=CH$(CF_2)_4$F.

Poly (or mono) fluoroalkyl fluoroethylenes wherein the poly (or mono) fluoroalkyl group has from 2 to 10 carbon atoms, such as $CH_2$=CF$(CF_2)_4$F, and $CH_2$=CF$(CF_2)_3$H.

Perfluorovinyl ethers such as $CF_2$=CFO$(CF_2CFXO)_m$Rf (wherein Rf is a $C_{1-6}$ perfluoroalkyl group, X is a fluorine atom or a trifluoromethyl group, and m is an integer of from 0 to 5).

Vinyl ethers having a carboxyl group or a sulfonate group, such as $CF_2$=CFO$(CF_2)_3$COOCH$_3$, and $CF_2$=CFOCF$_2$CF$(CF_3)$ OCF$_2$CF$_2$SO$_2$F.

The proportion of polymer units based on the fluorine-containing vinyl monomer is usually from 1 to 10 mols, preferably from 2 to 7 mols, per 100 mols of the total amount of polymer units based on TFE and polymer units based on ethylene.

For ETFE in the present invention, it is important that the viscosity factor $\phi$ defined by the above formula (1) is at most $1\times10^4$ Pa·sec, and the an elasticity factor $\epsilon$ defined by the above formula (2) is at most $5\times10^{-4}$ Pa$^{-1}$.

The above formula shows the relation between the strain and the time when a very small stress is exerted in a molten state of the polymer heated at a temperature of at least the melting point. If the molten liquid is a Newtonian fluid, the strain increases linearly with time. Namely, it is considered to be a fluid whereby $\epsilon$=0 in the formula (2). Whereas, ETFE is an agglomerate of linear molecules, and the molten liquid will not take an ideal Newtonian fluid behavior, since the molecules are entangled, and it shows a viscous behavior and an elastic behavior simultaneously against a very small stress, whereby the strain-time curve becomes non-linear. Namely, it is considered to be a fluid whereby $\epsilon$>0 in the formula (2). If such ETFE is melted and left to stand still, the surface of the molten liquid becomes smooth and flat by free movement of molecules and the own weight of the molten liquid itself, while it shows an elastic behavior as the linear molecules are entangled one another, which prevents the surface from becoming completely flat and smooth.

ETFE in the present invention has a viscosity factor $\phi$ of at most $1\times10^4$ Pa·sec, preferably from 500 to 7,000 Pa·sec. When the viscosity factor $\phi$ is at most $1\times10^4$ Pa·sec, mutual free movement of the molecules can be promoted. If the viscosity factor $\phi$ is larger than $1\times10^4$ Pa·sec, free movement of molecules will be suppressed, and a large stress and time will be required to obtain a smooth surface, and it tends to be difficult to obtain a smooth surface.

Further, ETFE to be used in the present invention has an anelasticity factor $\epsilon$ of at most $5\times10^{-4}$ Pa$^{-1}$, preferably from $1\times10^{-5}$ to $1\times10^{-4}$ Pa$^{-1}$. By adjusting the anelasticity factor $\epsilon$ to be at most $5\times10^{-4}$ Pa$^{-1}$, elastic resistance can be made small. If the anelasticity factor $\epsilon$ is larger than $5\times10^{-4}$ Pa–1, the mutual entangling effect of molecules tends to be large, and it tends to show a more elastic behavior, whereby it tends to be difficult to obtain a smooth surface.

ETFE having a viscosity factor $\phi$ of at most $1\times10^4$ Pa·sec can be obtained by controlling the molecular weight. If the molecular weight is too large, slipping of ETFE molecules one another will be suppressed, whereby the viscosity tends to be large, and the value of the viscosity factor $\phi$ will not be satisfied. Specifically, the control of the molecular weight of ETFE can be accomplished by e.g. the temperature, the pressure and/or the addition of a chain transfer agent during the polymerization. Further, as an index of the molecular weight of ETFE, the melt index (MI) is employed.

Further, ETFE having an anelasticity factor $\epsilon$ of at most $5\times10^{-4}$ Pa$^{-1}$ can be obtained by adjusting so that the proportion of polymer units based on the fluorine-containing vinyl monomer in ETFE will be usually within a range of from 1 to 10 mols per 100 mols of the total amount of polymer units based on TFE and polymer units based on ethylene.

Further, ETFE having an anelasticity factor $\epsilon$ of at most $5\times10^{-4}$ Pa$^{-1}$ can be obtained by charging the fluorine-containing vinyl monomer all at once at the initial stage of the polymerization, followed by the polymerization. The reason for this is not clearly understood, but is assumed to be such that the larger the number of polymer units based on the fluorine-containing vinyl monomer having a side chain, and the more uniform the distribution thereof in ETFE, the larger the mutual entangling effect of ETFE molecules, whereby the anelasticity factor $\epsilon$ will be large.

Accordingly, it is considered that by carrying out the polymerization by charging the fluorine-containing vinyl monomer all at once at the initial stage of the polymerization, the proportion of polymer units based on the fluorine-containing vinyl monomer in ETFE formed at the initial stage of the polymerization, is large, and as the polymerization approaches the terminal stage, ETFE having a small proportion of polymer units based on the fluorine-containing vinyl monomer will be formed. Thus by making the distribution of polymer units of the fluorine-containing vinyl monomer to be non-uniform, it is possible to obtain ETFE having a suitable anelasticity factor $\epsilon$.

The ETFE powder of the present invention is a powder having an average particle diameter of from 5 to 1,000 μm, preferably from 10 to 700 μm and an apparent density of at least 0.5 g/cc, preferably from 0.6 to 1.0 g/cc.

If the average particle diameter is smaller than 5 μm, the powder particles are likely to form agglomerates having air internally occluded by an electrostatic action. If such a powder is melted and solidified, the coating film will be one having air occluded therein, whereby the appearance and the surface smoothness as an object of the present invention will be impaired. If the average particle diameter is larger than 1,000 μm, it causes hard spots when it is melted and solidified, whereby the surface smoothness as the object of the present invention will be impaired. Further, if the apparent density is smaller than 0.5 g/cc, air present among the powder particles will be substantial, and when it is melted and solidified, it forms a coating film having air occluded, whereby the appearance and the surface smoothness as the object of the present invention will be impaired.

As a method for powdering ETFE, various conventional powdering methods may be employed. For example, there may be mentioned a method wherein ETFE is subjected to a mechanical pulverizer such as a pin mill or an impeller mill for powdering by an action of e.g. impact or shearing force, a method wherein a liquid having ETFE dispersed in a solvent, is sprayed in an atmosphere of at least the melting point for powdering, or a method wherein ETFE is subjected to a granulating machine such as a Henschel mixer, a high speed mixer or a mechanofusion for granulation and powdering.

The ETFE powder of the present invention has a feature that the melt flow property is high under a low shearing stress and is capable of realizing an extremely high surface smoothness even when melted and solidified under a static condition such as a powder molding.

In the molding method for the ETFE powder of the present invention, the ETFE powder is deposited on a substrate surface, followed by heat melting and cooling for solidification to form a coating film.

As a specific method for depositing the ETFE powder on the substrate surface, there may, for example, be mentioned a method wherein by an electrostatic powder coating machine, the powder is deposited on the substrate surface by an electrostatic action, a method wherein the powder is subjected to a fluidized tank and the powder is melt-deposited on a heated substrate surface, or a method wherein the powder is charged into a hollow substrate, which is subjected to a rotational molding machine for rotation to deposit the powder on the substrate surface.

The heat melting of the ETFE powder deposited on the substrate surface can be carried out by various conventional heating means. For example, heating in an electric furnace, heating in a gas burner furnace, heating by direct flame, or a continuous system electric furnace, may be mentioned. The temperature for heat melting may be a temperature where the ETFE powder will melt, and it is usually from 250 to 350° C.

Further, the heat-melted ETFE powder is cooled for solidification, and the cooling for solidification may be carried out at a temperature where the heat-melted ETFE powder will be solidified, and it is usually carried out at a temperature of at most the melting point, specifically from room temperature to about 200° C.

The thickness of the coating film formed by the ETFE powder is usually at least 30 μm, preferably from 50 to 5,000 μm.

The coating film to be formed by the present invention may be of a single layer or of multilayers.

A method for making the coating film to be of multilayers may, for example, be a method wherein on a substrate surface, at least one layer of a coating film layer formed by the ETFE powder used in the present invention or a layer formed by other ETFE, or a composite multilayer comprising at least one member from each of the two layers, is preliminarily coated, and the ETFE powder of the present invention is deposited thereon, followed by heat melting and cooling for solidification to form a coating film. The ETFE powder of the present invention has good compatibility with other ETFE in a molten state and is capable of forming a multilayer coating film which is scarcely peeled.

Other ETFE layer may be a coating film formed by depositing other ETFE powder on a substrate surface, followed by heat melting and cooling for solidification, or a coating film formed on a substrate surface by a coating material containing other ETFE, or having a molded product such as a sheet or a film of other ETFE laminated on a substrate surface.

Other ETFE is ETFE other than ETFE to be used in the present invention, and specifically, it is a copolymer of ethylene with TFE, or a copolymer of ethylene, TFE and a fluorine-containing vinyl monomer copolymerizable therewith, whereby the viscosity factor $\phi$ in the formula (1) exceeds $1\times10^4$ Pa·sec, the anelasticity factor $\epsilon$ of the formula (2) exceeds $5\times10^{-4}$ Pa$^{-1}$, the average particle diameter is less then 5 $\mu$m or more than 1,000 $\mu$m, or the apparent density is less than 0.5 g/cc. The copolymerizable fluorine-containing vinyl monomer may be the same as described above.

The coating film to be formed by the present invention, may be made to have a surface smoothness of at most 0.1 $\mu$m as measured by the surface roughness $R_a$.

The substrate to be used in the present invention is not particularly limited. For example, those made of various materials such as inorganic materials such as metals, concrete or ceramics or organic materials such as heat resistant plastics, may be mentioned.

Now, the present invention will be described in detail with reference to Examples (Examples 1 to 4) and Comparative Examples (Examples 5 and 6), but the present invention is not thereby limited. Further, in the following Examples, the physical properties and characteristics of ETFE, its powder and coating films, were measured by the following methods.

(1) Melt viscoelasticity: Using a Rotary rheometer (CS rheometer, manufactured by BOHLIN Company), the strain was measured under a load of 50 Pa at a temperature of 300° C. with a plate diameter of 25 mm and a plate clearance of 1 mm, and by the curve fitting of the formula (1), the viscosity factor 4 and the anelasticity factor $\epsilon$ were obtained.

(2) Melt index (MI): Using a Meltindexer (manufactured by Takara Kogyo K.K.), it was measured under a load of 5 kg at 297° C. in accordance with ASTM D3159.

(3) Average particle size: Using an average diameter distribution measuring apparatus of a laser diffraction system (HELOS & RODOS, manufactured by Simpatec Company), it was measured by a dry method.

(4) Apparent density: Measured in accordance with JIS K6891.

(5) Film thickness: A magnetic substrate was measured by means of an electromagnetic system film thickness meter, and a non-magnetic substrate was measured by means of an eddy current system film thickness meter.

(6) Surface roughness: Measured by means of a contact system surface roughness meter.

EXAMPLE 1

A stainless steel autoclave having an internal capacity of 10 l was evacuated, and 3,360 g of water, 5,056 g of $C_6F_{13}H$, 543 g of a chain transfer agent $CClF_2CF_2CHClF$ (hereinafter referred to as HCFC225cb), 80 g of (perfluorobutyl)ethylene (hereinafter referred to as PFBE), 743 g of TFE and 26 g of ethylene were charged, stirred at 400 rpm and heated to 650° C. 50 cc of a polymerization initiator (a 50 wt % HCFC225cb solution of tert-butyl peroxyisobutylate) was added to initiate the polymerization. A mixed gas of TFE/ethylene (60/40 (molar ratio)) was added to bring the pressure to be constant at 14.1 kg/cm$^2$G. Eight hours later, the system was cooled, an unreacted monomer was purged, and the solvent was distilled to obtain 817 g of white ETFE.

The ETFE had MI of 21.9, a viscosity factor $\phi$ of 4285 Pa·sec and an anelasticity factor $\epsilon$ of $8.38\times10^{-5}$ Pa$^{-1}$. Further, as a result of an analysis by NMR, the ratio of polymer units based on TFE of said ETFE/polymer units based on ethylene/polymer units based on PFBE was 68/32/3.3 (molar ratio).

Further, the ETFE was pulverized by an impact mill LS-1 (manufactured by Dulton Company) to obtain a powder having an average particle diameter of 35 $\mu$m and an apparent density of 0.61 g/cc.

This ETFE powder was supplied to an electrostatic coating machine (GX3300S, manufactured by Onoda) and coated on an aluminum plate of 150×150×2 mmt and heated and melted in an electric furnace at 270° C. for 20 minutes. Then, it was cooled to room temperature for solidification. The thickness of the obtained coating film was about 63 $\mu$m. Further, the surface roughness $R_a$ of the coating film was 0.054 $\mu$m.

EXAMPLE 2

The same operation as in Example 1 was repeated except that the initially charged HCFC225cb was changed to 435 g, to obtain 920 g of white ETFE. The ETFE had a MI of 13.7, a viscosity factor $\phi$ of 6,464 Pa·sec, and an anelasticity factor $\epsilon$ of $9.82\times10^{-5}$ Pa$^{-1}$. Further, as a result of an analysis by NMR, the ratio of polymer units based on TFE of the ETFE/polymer units based on ethylene/polymer units based on PFBE was 71/29/2.8 (molar ratio).

Further, the ETFE was pulverized by an impact mill LS-1 (manufactured by Dulton Company) to obtain a powder having an average particle diameter of 168 $\mu$m and an apparent density of 0.73 g/cc.

In a fluidized bed tank (manufactured by Sames K.K.) to which this powder was supplied, a flat plate of steel material SS400 of 50×100×3 mmt preliminarily heated to 350° C. was immersed, and then, this flat plate was further heated for 20 minutes at 300° C. in an electric furnace. The thickness of the coating film was about 513 $\mu$m. The surface roughness $R_a$ of the coating film was 0.084 $\mu$m.

EXAMPLE 3

The same operation as in Example 1 was repeated except that the initially charged HCFC225cb was changed to 712 g, to obtain 820 g of white ETFE in 7 hours. The ETFE had a MI of 34.5, a viscosity factor $\phi$ of 2,797 Pa·sec, and an anelasticity factor $\epsilon$ of $5.35\times10^{-5}$ Pa-1. Further, as a result of an analysis by NMR, the ratio of polymer units based on TFE of the ETFE/polymer units based on ethylene/polymer units based on PFBE was 64/36/3.8 (molar ratio).

Further, the ETFE was pulverized by a power mill P-3 model (manufactured by Dulton Company) to obtain a powder having an average particle diameter of 543 $\mu$m and an apparent density of 0.81 g/cc.

This powder was introduced into a flanged carbon steel tube SGP pipe having a length of 100 mm and 50 A, and both flanges were closed by exclusive covers. This pipe was set in a rotary molding machine and heated at 300° C. for 1.5 hours while rotated by twin screw to melt the powder. Then, the melt was cooled to room temperature and solidified, and then the pipe was taken out from the molding machine. On the inner surface of the pipe, the ETFE was lined, and the thickness of the coating film was about 2.1 mm. The surface roughness $R_a$ of the coating film was 0.067 $\mu$m.

EXAMPLE 4

The ETFE powder obtained in Example 3 was introduced into a flanged carbon steel tube SGP pipe having a length of 100 mm and 50 A, which had the surface preliminarily lined with ETFE (Aflon COP.ZL522, manufactured by Asahi Glass Company, Limited) to have a thickness of the coating film of about 2.1 mm and a surface roughness $R_a$ of the coating film of 0.764 μm, and both flanges were closed by exclusive covers. This pipe was set in a rotary molding machine and heated at 300° C. for 1.5 hours while rotated by twin screw to melt the powder. Then, the melt was cooled to room temperature and solidified, and then the pipe was taken out from the molding machine. On the inner surface of the pipe, the ETFE was lined, and the thickness of the coating film was about 3.8 mm. The surface roughness $R_a$ of the coating film was 0.035 μm.

EXAMPLE 5

The same operation as in Example 1 was repeated except that PFBE was not charged all at once at the initial stage, and the initial charge of PFBE was only 53 g, and thereafter, a mixed gas of TFE/ethylene/PFBE (60/40/3 (molar ratio)) was added, to obtain 796 g of white ETFE. The ETFE had a MI of 19.8, a viscosity factor φ of 6,851 Pa·sec and an anelasticity factor ε of $6.32 \times 10^{-4}$ $Pa^{-1}$. Further, as a result of an analysis by NMR, the ratio of polymer units based on TFE of the ETFE/polymer units based on ethylene/polymer units based on PFBE was 64/36/3.9 (molar ratio).

Further, the ETFE was pulverized by an impact mill LS-1 (manufactured by Dulton Company) to obtain a powder having an average particle diameter of 28 μm and an apparent density of 0.57 g/cc.

This powder was supplied to an electrostatic coating machine (GX3300S, manufactured by Onoda) and coated on an aluminum plate of 150×150×2 mmt, and heated and melted in an electric furnace at 280° C. for 20 minutes. Then, it was cooled to room temperature and solidified. The thickness of the coating film was about 51 μm. The surface roughness $R_a$ was 0.194 μm.

EXAMPLE 6

The same operation as in Example 1 was repeated except that the initially charged HCFC225cb was changed to 200 g, to obtain 820 g of white ETFE in 8 hours. The ETFE had a MI of 6.74, a viscosity factor φ of 11,096 Pa·sec and an anelastic factor ε of $1.41 \times 10^{-5}$ $Pa^{-1}$. Further, as a result of an analysis by NMR, the ratio of polymer units based on TFE of the ETFE/polymer units based on ethylene/polymer units based on PFBE was 67/33/2.5 (molar ratio).

Further, the ETFE was pulverized by a power mill P-3 (manufactured by Dulton Company) to obtain a powder having an average particle diameter of 643 μm and an apparent density of 0.82 g/cc.

This powder was introduced into a flanged SGP pipe having a length of 100 mm and 50 A, and both flanges were closed with exclusive covers. This pipe was set in a rotary molding machine and heated at 300° C. for 1.5 hours while rotated by twin screw, to melt the powder. Then, it was cooled to room temperature and solidified, and then the pipe was taken out from the molding machine on the inner surface of the pipe, the ETFE was lined, and the thickness of the coating film was about 2.6 mm. The surface roughness $R_a$ was 0.678 μm.

According to the molding method for the ETFE powder of the present invention, the surface smoothness of the coating film thereby obtained, can be substantially improved.

INDUSTRIAL APPLICABILITY

With the ETFE powder of the present invention, the melt flowing property is high under a low shearing stress, and by powder molding, a coating film having a smooth surface can be obtained. It can be used widely as a corrosion resistant lining material for an inorganic material such as metal or concrete or for an organic material such as a heat resistant resin, or as a material for corrosion resistant containers.

What is claimed is:

1. A method comprising,
   depositing a copolymer powder on a substrate surface, followed by
   heat melting, and
   cooling for solidification to form a coating film having a surface smoothness of at most 0.1 μm as measured by $R_a$, wherein the copolymer powder comprises polymerized units of ethylene, tetrafluoroethylene and (perfluorobutyl)ethylene,
   wherein the copolymer powder has a viscoelastic property represented by formula (1), wherein the viscosity factor 100 is at most $1 \times 10^4$ Pa·sec, and the anelasticity factor ε represented by formula (2) as the sum of $\epsilon_i$ in the formula (1) is at most $5 \times 10^{-4}$ $Pa^{-1}$, and which has an average particle diameter of from 5 to 1,000 μm and an apparent density of at least 0.5 g/cc:

$$J(t) = t/\varphi + \sum_{i=1}^{6} [\varepsilon_i(1 - \exp(-t/\tau_i))] \quad (1)$$

$$\varepsilon = \sum_{i=1}^{6} \varepsilon_i \quad (2)$$

wherein the formulae (1) and (2), J(t) is the amount of strain per unit stress under a predetermined stress, φ is a viscosity factor, t is time, μ is an anelasticity factor, i is an integer of from 1 to 6, and $\tau_i$ is a constant wherein $\tau_1$=0.1 35 sec, $\tau_2$=0.368 sec, $\tau_3$=1.000 sec, $\tau_4$=2.718 sec, $\tau_5$=7.389 sec, $\tau_6$=20.086 sec.

2. The method according to claim 1, wherein the substrate surface is preliminarily coated with an ethylene/tetrafluoroethylene copolymer layer.

3. The method according to claim 1, wherein the viscosity factor φ in the formula (1) is from 500 to 7,000 Pa·sec, and the anelasticity factor ε is from $1 \times 10^{-5}$ to $1 \times 10^{-4}$ $Pa^{-1}$.

4. The method according to claim 1, wherein the average particle diameter of the copolymer powder is from 10 to 700 μm and the apparent density is from 0.6 to 1.0 g/cc.

5. The method of claim 1, wherein the molar ratio of polymerized units of tetrafluoroethylene to polymerized units of ethylene is from 90/10 to 50/50.

6. The method of claim 1, wherein the amount of polymerized units of (perfluorobutyl)ethylene is from 1 to 10 mols per 100 mols of the total amount of polymerized units of tetrafluoroethylene and ethylene.

7. The method of claim 1, wherein the amount of polymerized units of (perfluorobutyl)ethylene is from 2 to 7 mols per 100 mols of the total amount of polymerized units of tetrafluoroethylene and polymerized units of ethylene.

8. The method of claim 1, wherein the coating film has a thickness of at least 30 μm.

9. The method of claim 1, wherein the coating film has a thickness of from 50 to 5,000 μm.

10. The method of claim 1, wherein heat melting comprises rotary molding.

11. The method of claim 1, wherein the copolymer powder has an apparent density of from 0.6 to 1.0 g/cc.

12. The method of claim 1, wherein heat melting is carried out at a temperature range of 250–350° C.

13. The method of claim 1, wherein heat melting is carried out at a temperature range of 300–350° C.

14. The method of claim 1, wherein the copolymer is obtained by a polymerization process wherein the total amount of the (perfluorobutyl)ethylene monomer is charged all at once to an initial stage of the polymerization.

* * * * *